US008313381B2

(12) United States Patent
Ackley et al.

(10) Patent No.: US 8,313,381 B2
(45) Date of Patent: Nov. 20, 2012

(54) SYSTEM AND METHOD FOR PERSONALIZED LOCATION-BASED GAME SYSTEM INCLUDING OPTICAL PATTERN RECOGNITION

(75) Inventors: Jonathan Ackley, Glendale, CA (US); Chris J. Purvis, La Crescenta, CA (US); Christopher R. Antimary, Los Angeles, CA (US)

(73) Assignee: Disney Enterprises, Inc., Burbank, CA (US)

( * ) Notice: Subject to any disclaimer, the term of this patent is extended or adjusted under 35 U.S.C. 154(b) by 1028 days.

(21) Appl. No.: 12/313,925

(22) Filed: Nov. 25, 2008

(65) Prior Publication Data

US 2010/0130286 A1  May 27, 2010

(51) Int. Cl.
*A63F 9/24* (2006.01)
*A63F 13/00* (2006.01)

(52) U.S. Cl. ................. 463/42; 463/30; 463/32; 463/36
(58) Field of Classification Search ................. 463/30, 463/32, 36, 42
See application file for complete search history.

(56) References Cited

U.S. PATENT DOCUMENTS

| 6,761,637 B2 | 7/2004 | Weston | |
| 2006/0154726 A1* | 7/2006 | Weston et al. | 463/37 |
| 2007/0086638 A1* | 4/2007 | Ackley et al. | 382/132 |
| 2008/0039206 A1* | 2/2008 | Ackley et al. | 463/40 |
| 2008/0100620 A1* | 5/2008 | Nagai et al. | 345/424 |
| 2009/0298586 A1* | 12/2009 | Ackley et al. | 463/31 |
| 2010/0151942 A1* | 6/2010 | Horovitz | 463/30 |
| 2011/0207531 A1* | 8/2011 | Gagner et al. | 463/30 |

FOREIGN PATENT DOCUMENTS

WO  WO 2006025137 A1 * 3/2006

* cited by examiner

*Primary Examiner* — N Drew Richards
*Assistant Examiner* — John P Dulka
(74) *Attorney, Agent, or Firm* — Farjami & Farjami LLP

(57) ABSTRACT

There is provided a personalized game system comprising a user account database containing user accounts for a plurality of users, a pattern database containing recognition data for a plurality of patterns, a controller in communication with the user account database and the pattern database, and a game installation. The game installation comprises an audiovisual presentation system, an identification interface in communication with the controller to read a user identifier to identify a user account of a user from the user account database, and an optical interface in communication with the controller to optically read a card pattern on a game card to match the card pattern with a pattern in the pattern database, the game card having no physical contact with the game installation. The controller is configured to change a state of the game system based on the matched pattern.

20 Claims, 4 Drawing Sheets

SYSTEM AND METHOD FOR PERSONALIZED LOCATION-BASED GAME SYSTEM INCLUDING OPTICAL PATTERN RECOGNITION

BACKGROUND OF THE INVENTION

1. Field of the Invention

The present invention relates generally to game systems. More particularly, the present invention relates to interactive game systems.

2. Background Art

Collectible trading card games are enjoying a recent resurgence in popularity with franchises, such as POKEMON and YU-GI-OH, beloved by players worldwide. Additionally, amusement centers and arcades are luring new players with new card-based game systems that combine the humble paper card with new forms of interactivity. Aided by widely available and low cost optics, detection of cards and other physical objects within gaming systems is now commercially feasible on a large scale. The widespread integration of cameras in mobile phones, computer displays, and laptop computers confirms the vast market penetration of low cost optical hardware.

A number of optics-based devices have already been introduced into the gaming market. Some systems using these devices rely on machine-readable printed codes or embedded data that are unrecognizable to a human viewer, often consisting of game code or data. Unfortunately, these codes tend to be readily reverse-engineered and modified in order to manipulate and cheat game systems in unintended ways. Additionally, since game customization logic often relies on this embedded data, future changes to the game system may be difficult to implement, as the embedded data on the cards may be difficult or impossible to modify.

Besides the security problems inherent in many of these game systems, interaction is also generally limited to one physical location only, with the cards or objects placed in very specific predetermined positions for detection purposes. The physical location of the player is thus rendered irrelevant in these systems, largely limiting gameplay paradigms to existing genres, such as tabletop gaming or traditional sedentary video-based gaming. However, gaming experiences offering physical movement and manipulation of physical objects have the potential to offer exciting and enjoyable new gameplay options.

One difficulty in implementing physical gaming experiences in the home is the limited ability to customize the environment of the user within the confines of the home entertainment center. To create the strongest impression on the user, an elaborate hardware setup is often necessary, which may be difficult or impossible to recreate at home. These specially prepared environments lend themselves more easily to installations at recreation centers, video game arcades, amusement parks, and other similar locations where game system operators have more creative control over the environment. Unfortunately, a busy user may not have frequent opportunities to visit these entertainment areas but may still desire to continue the game experience at home.

Accordingly, there is a need to overcome the drawbacks and deficiencies in the art by providing a game system playable at home or in a specially prepared environment that avoids the security issues of embedded card data but still leverages the enduring popularity of card-based game systems and the new trend towards integrating physical activity in gaming experiences.

SUMMARY OF THE INVENTION

There are provided systems and methods for personalized location-based games including optical pattern recognition, substantially as shown in and/or described in connection with at least one of the figures, as set forth more completely in the claims.

BRIEF DESCRIPTION OF THE DRAWINGS

The features and advantages of the present invention will become more readily apparent to those ordinarily skilled in the art after reviewing the following detailed description and accompanying drawings, wherein.

DETAILED DESCRIPTION OF THE INVENTION

The present application is directed to systems and methods for personalized location-based games including optical pattern recognition. The following description contains specific information pertaining to the implementation of the present invention. One skilled in the art will recognize that the present invention may be implemented in a manner different from that specifically discussed in the present application. Moreover, some of the specific details of the invention are not discussed in order not to obscure the invention. The specific details not described in the present application are within the knowledge of a person of ordinary skill in the art. The drawings in the present application and their accompanying detailed description are directed to merely exemplary embodiments of the invention. To maintain brevity, other embodiments of the invention, which use the principles of the present invention, are not specifically described in the present application and are not specifically illustrated by the present drawings.

Figure 1:
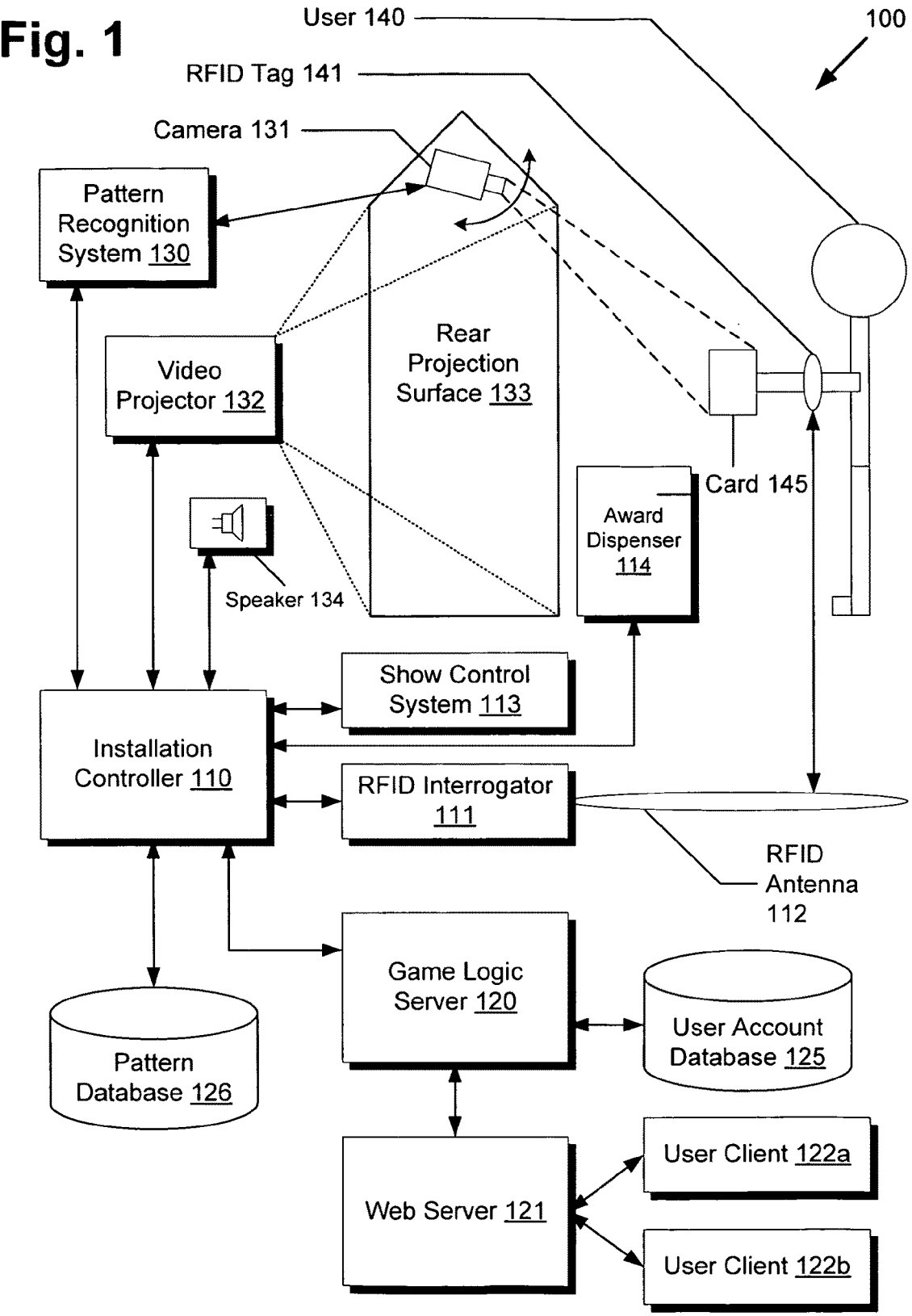
FIG. 1 presents a block diagram of a game installation providing a personalized game system including optical pattern recognition, according to one embodiment of the present invention.

FIG. 1 presents a block diagram of a game installation providing a personalized game system including optical pattern recognition, according to one embodiment of the present invention. Installation 100 includes installation controller 110, radio frequency identification (RFID) interrogator 111, RFID antenna 112, show control system 113, award dispenser 114, game logic server 120, web server 121, user client 122a, user client 122b, user account database 125, pattern database 126, pattern recognition system 130, camera 131, video projector 132, rear projection surface 133, speaker 134, user 140, RFID tag 141, and card 145. Interconnections between components may be supported by a wired or wireless network or by physical cable signaling.

To better conceptualize FIG. 1, the overall system might be divided into four broad categories: a presentation layer, for providing sensory feedback to the user; an optical interface, for detecting patterns from a card presented by the user; an identification interface, for identifying a particular user and the associated user account; and a logic layer, for controlling the rules and mechanics of the game system. The presentation layer might include video projector 132, rear projection surface 133, speaker 134, and show control system 113. The optical interface might include pattern recognition system 130, camera 131, card 145, and pattern database 126. The identification interface might include RFID interrogator 111, RFID antenna 112, user 140, RFID tag 141, and user account database 125. The logic layer might include installation controller 110, game logic server 120, web server 121, and user account database 125.

Installation controller 110 is the central coordinator for the installation depicted in FIG. 1. Since the game experience will be tailored to the particular user who is playing, a good first step might utilize the identification interface to identify the user and the associated account. RFID interrogator 111 and RFID antenna 112 may be used to read RFID tag 141, which might be on the person of user 140 via a worn wristband or some other unobtrusive manner. This RFID tag might be provided to user 140 at a registration kiosk or via mail after the user duly registers an account in user account database 125. Identifying details can thus be read from RFID tag 141, such as a unique account number of user 140, and then further passed to game logic server 120. Although FIG. 1 uses cost effective RFID technology to identify user 140, alternative data transmission technologies for implementing an identification interface can also be utilized.

For example, alternative embodiments might use infrared transmission, optical codes, or biometric scanning. Infrared receivers could be placed in the installation and an infrared transmitter sending an identification code could be placed on user 140, or vice versa. A separate camera or the existing camera 131 might be used to optically read a printed identification code such as a barcode placed somewhere on user 140, such as a wristband. A biometric scanner placed in the installation or prior to entering the installation might detect various biometric traits of user 140, including, for example, facial features, fingerprints, handprints, or eye irises. These alternative identification interfaces may substitute for the RFID methods used in the present example.

Game logic server 120 keeps track of game state and may also interface with external clients such as user client 122a and user client 122b connected to web server 121. Once game logic server 120 receives identifying details regarding user 140, it can query user account database 125 to identify the associated user account to be used for the current gaming session. After identifying user 140, game logic server 120 may prepare an appropriate game scenario to be carried out by installation controller 110.

It should be noted that FIG. 1 is only an exemplary embodiment, and many other valid configurations may also implement the same system. Servers may be segmented to allow specialization of tasks, or servers may be consolidated to simplify operations and optimize resources. Redundant hardware might be added for load balancing and to implement a scalable resource pool as usage demands grow. Components may be removed if a particular system design renders the components superfluous. For example, award dispenser 114 might be eliminated if only intangible rewards are granted to the user account, rendering physical rewards from award dispenser 114 unnecessary.

Now that the identification interface has identified user 140 and the logic layer has prepared a game scenario, the presentation layer may begin directing user 140 to start engaging the now ready game system. The presentation layer includes video projector 132 showing visual content on rear projection surface 133, speaker 134 outputting audio, and show control system 113 manipulating the local environment. For example, the prepared game scenario might involve user 140 fighting against a simulated opponent by using cards to select attacks and invoke battle strategies. Thus, video projector 132 might show an image of a dragon as an opponent, speaker 134 might output the roars of the dragon and voice prompts of the game system, and show control system 113 might provide suitable ambiance by, for example, initiating a fog machine to create a foreboding atmosphere, causing the ground to shake when an enemy attack hits, and manipulating lighting controls to simulate magic effects.

After the presentation layer introduces the dragon to user 140, speaker 134 might inform user 140 through a voice prompt that he has the initiative in the battle and should draw a card to begin the player turn phase. Thus, user 140 selects card 145 from his deck, and holds it up. In response, the optical interface may begin the process to identify card 145. Thus, camera 131 might adjust its angle, zoom, and other properties to obtain a focused image of card 145 sufficient for pattern recognition purposes. The detection of RFID tag 141 in respect to RFID antenna 112 might provide additional location information for camera 131 by narrowing the possible position of card 145 with respect to user 140. Additionally, a supplemental camera or object detection system might further guide the focus of camera 131 if additional precision is necessary. The complexity of the optical interface may depend upon the tolerances needed for the chosen game system implementation.

For example, if the card will be placed in a fixed position such as a card receptacle placed on a stationary pedestal, then camera 131 might be pre-configured to focus on the card receptacle, thus avoiding the need for an adjustable camera. On the other hand, if a more dramatic interactivity model is desired whereby the user simply holds the desired card up without physically contacting any part of the game installation, then the card image retrieval system may need to compensate for differences in positioning, user height, arm length, card angle, and other factors. Additionally, the system may need image stabilization algorithms due to user movement and unsteady hands, as it may be difficult for the user to hold a card perfectly still. However, the complexity of the optical interface may be justified by the increased game immersion and intuitiveness enabled by reading the card image without requiring rigid physical contact rules commonly used in simpler detection systems.

Orientation of the pattern might also provide further customization possibilities for gameplay. For example, a standard portrait oriented card might indicate the user wishes to use the card normally, whereas a sideways landscape oriented card might indicate that the user wishes to combine the card effect with a second card, and an upside down card might indicate the user wants to "sacrifice" that card for a stronger effect on the next played card. Various gameplay mechanics could be devised based on the particular orientation of the card. In this case, camera 131 may require sophisticated hardware assistance to retrieve an image of card 145 in acceptable quality to discern card orientation angles and other imaging details.

Pattern recognition system 130 matches the images retrieved by camera 131 against pattern database 126 to determine a match to a pattern. Pattern database 126 might include a catalog of images corresponding to all valid card designs in the games available to play. For example, a card with an image of a snowflake might represent the magic attack spell "Ice Blast." If card 145 has this same image printed on it, then pattern recognition system 130 will apply pattern and image analysis algorithms to match card 145 with the "Ice Blast" image cataloged in pattern database 126.

Although one implementation might restrict each card to only one pattern for simplicity, alternative embodiments might embed multiple patterns on a single card. For example, there might be a set of monster summoning cards for use in the game system. The summoning cards might include a card for Scylla including a "Scylla" image pattern, a card for Charybdis including a "Charybdis" image pattern, and a combination card for Scylla and Charybdis containing both the "Scylla" and "Charybdis" image patterns. Thus, although pattern database 126 might only include the "Scylla" and "Charybdis" image patterns, pattern recognition system 130 could be configured to recognize all three summoning cards by parsing all available patterns detected on a presented card.

Once the optical interface determines the available patterns, the logic layer at installation controller 110 may query game logic server 120 to verify that the card with the "Ice Blast" image is properly registered in the user account for user 140, which can be checked in user account database 125. This may help enforce the rules of the game by ensuring only properly registered card decks are in use and that previously used cards are not improperly reused if the game system forbids cards to be reused in the same gaming session.

Additionally, while verifying the presence of the card in the deck, any customizations user 140 might have made to his deck can also be retrieved. For example, the game might support card customization in the form of boosted statistics or special effects, which can be associated with the user account and applied as necessary. Thus, the user might customize his "Ice Blast" card to inflict extra damage at the risk of higher possibility of a spell backfire in addition to changing the color of the spell effect from a default blue color to purple. Thus, game logic server 120 can integrate the extra damage bonus and the increased risk of a spell backfire while show control system 113 can change the lighting effect from blue to purple when the spell effect is shown.

After the player phase is over, the enemy phase might begin if the game system is turn based. Alternative game systems might integrate real-time game elements where speed of the card draw and clever timing may affect the outcome of the game. The opponent depicted on rear projection surface 133 might comprise a computer-controlled artificial intelligence, or it might comprise a networked human player. The networked human player might be playing on an installation similar to the installation utilized by user 140, or the human player might be playing through a more orthodox interface such as a web-based game client, which could be user client 122a or user client 122b running on a web browser of a personal computer and interfacing with web server 121. The player and enemy phases might alternate back and forth until either the user or the opponent is victorious. A winning player might receive a reward in the form of a new card or voucher via award dispenser 114, or the user account associated with the winning player might receive some kind of gift or bonus.

Although the scenario given so far has focused on competitive dueling battles, alternative game scenarios might focus on other modes of interactivity, such as nurturing a virtual pet or social interaction with avatars. The game system might support multiple different games tailored to different tastes and interests, and the user account associated with the player could then determine which game scenario should be presented to the user when an installation is activated by the detection of the user.

Additionally, any object could be used for pattern recognition, although the pattern recognition steps thus far have focused on reading patterns from printed cards. Printed cards may be well suited for commercial gaming applications due to their low cost of manufacture, portability, and ease of use. Certain game systems might even allow users to register and print their own custom cards at home using commodity hardware such as inkjet printers, extending replay value and helping to maintain user interest. These customization possibilities may be severely limited if expensive proprietary cards with embedded chips or other potentially costly technologies are utilized. Optionally, enhanced customization features enabled by easily reproducible cards may help in leveraging user generated content.

Figure 2:
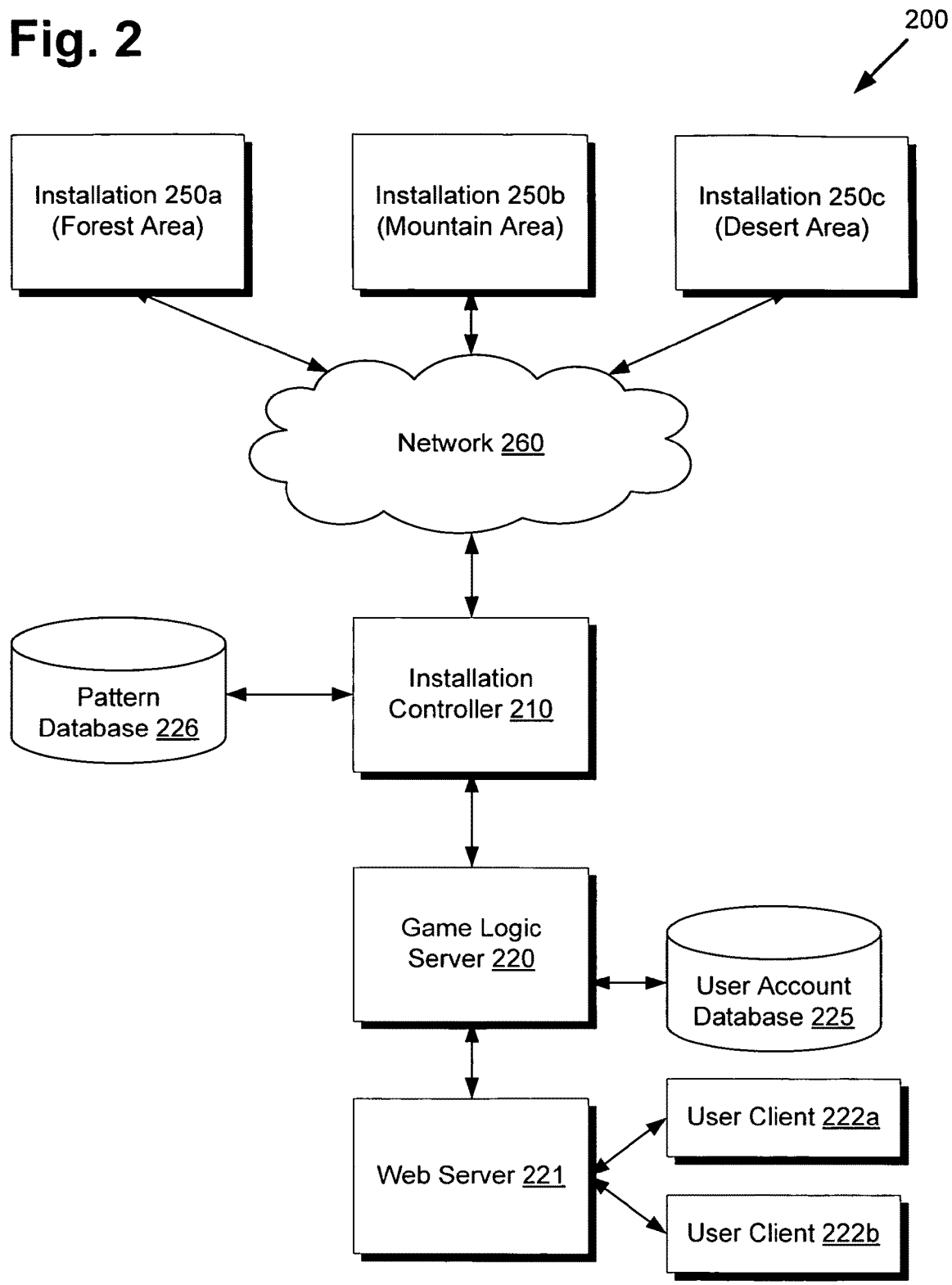
FIG. 2 presents a block diagram of a plurality of networked game installations providing a personalized location-based game system including optical pattern recognition; the game system is also playable via a client system outside the plurality of installations, according to one embodiment of the present invention.

FIG. 2 presents a block diagram of a plurality of networked game installations providing a personalized location-based game system including optical pattern recognition, the game system also playable via a client system outside the plurality of installations, according to one embodiment of the present invention. Installation network 200 includes installation controller 210, game logic server 220, web server 221, user client 222a, user client 222b, user account database 225, pattern database 226, installation 250a, installation 250b, installation 250c, and network 260. Installation controller 210 corresponds to installation controller 110 from FIG. 1. Game logic server 220 corresponds to game logic server 120 from FIG. 1. Web server 221 corresponds to web server 121 from FIG. 1. User client 222a and user client 222b correspond to user client 122a and user client 122b from FIG. 1. User account database 225 corresponds to user account database 125 from FIG. 1. Pattern database 226 corresponds to pattern database 126 from FIG. 1. Installation 250a, installation 250b, and installation 250c may correspond to installation 100 from FIG. 1.

Although FIG. 2 presents a single centralized installation controller 210 to mediate logic and control, alternative embodiments may employ multiple installation controllers for each installation, a distributed network of installation controllers, or any other desired configuration based on processing workload requirements, logistical constraints, redundancy against outages, and other factors. However, a single installation controller embodiment shall be illustrated for the sake of simplicity.

The multiple game installation network depicted in FIG. 2 enables the addition of location-based gameplay to the game system discussed so far. Thus, installation 250a, installation 250b, and installation 250c might be placed in three separate unique regions within a controlled area such as a theme park or an amusement center. These separate unique regions might, for example, represent different themes, terrain, or geographic areas. In FIG. 1, installation 250a corresponds to a forest area, installation 250b corresponds to a mountain area, and installation 250c corresponds to a desert area. The environments of each respective installation might be configured to convey a sense of the representative terrain. For example, the forest area might be filled with foliage props, while the mountain area might be designed with sloping floors, and the desert area might be sandy with a higher temperature than the other areas. With these separate and distinct installations available to the player, various location-based gameplay elements can be implemented.

For example, particular opponents might only appear in particular areas—the aforementioned dragon might only appear in installation 250c, the desert area, whereas a tiger opponent might only appear in installation 250b, the mountain area, and a bear opponent might only appear in installation 250a, the forest area. Each opponent might provide a unique reward for being defeated, encouraging the player to explore all available installations.

Alternatively, each installation might be used as part of a larger itinerary, with particular events advancing the user through a larger game campaign. For example, users might be first directed to defeat the bear in the forest area of installation 250a, then advance to the tiger in the mountain area of installation 250b, then finally to the dragon in the desert area of installation 250c. Unless this particular sequence of events occurs, generic opponents might be presented to the player instead, with rewards that may be less valuable than those obtained in the larger game campaign. In this manner, the multiple installations can be used to setup elaborate "quests" with corresponding rewards that may help keep the user engaged and motivated to continue playing the game system.

Installation controller 210 and game logic server 220, aided by network 260, can centrally coordinate the logic layer necessary to support installation 250a, installation 250b, and installation 250c. Each installation may be configured similarly to the diagram in FIG. 1, each with an independent presentation layer, optical interface, and identification interface for supporting the game system. Each installation might then access installation controller 210 and game logic server 220 for data exchange with database 225 and pattern database 226 as well as execution of the logic layer. However, as previously discussed, alternative embodiments might implement network configurations with multiple installation controllers. For example, installation 250a, installation 250b, and installation 250c might each include an independent installation controller.

Since game logic server 220 is also interfaced with web server 221, the game system of FIG. 2 may also be playable in a more traditional gaming environment independent of the game installations, such as a web based online game hosted on web server 221. User clients 222a and 222b might then represent users at home or at an Internet café playing the card battle game within a Flash or Java based application hosted on web server 221. The ability of the game system to use the same user account for both elaborate specialized game installations and more traditional gaming devices encourages continued game participation and a greater sense of reward from gameplay. With easily accessible devices such as Internet connectable personal computers or video game consoles, users with limited leisure time to visit the gaming installations can still continually build their card decks and grow their virtual characters in a more traditional video gaming experience, enjoying the fruits of their labor with greater impact in their limited time available within the immersive game installations.

Competitive multiplayer interactivity is also a possible feature of the game system, with users at different installations dueling against each other or against home users such as user client 222a or user client 222b connected via web server 221. When a duel match is decided, a losing party might forfeit one of his cards to the corresponding award dispenser at his installation, whereas the winning party might gain that same card as a new entry in his deck. Since the cards are simply printed cards, a newly printed card might simply be issued to the winning party rather than physically transporting the losing party's forfeited card to the winning party.

Figure 3:
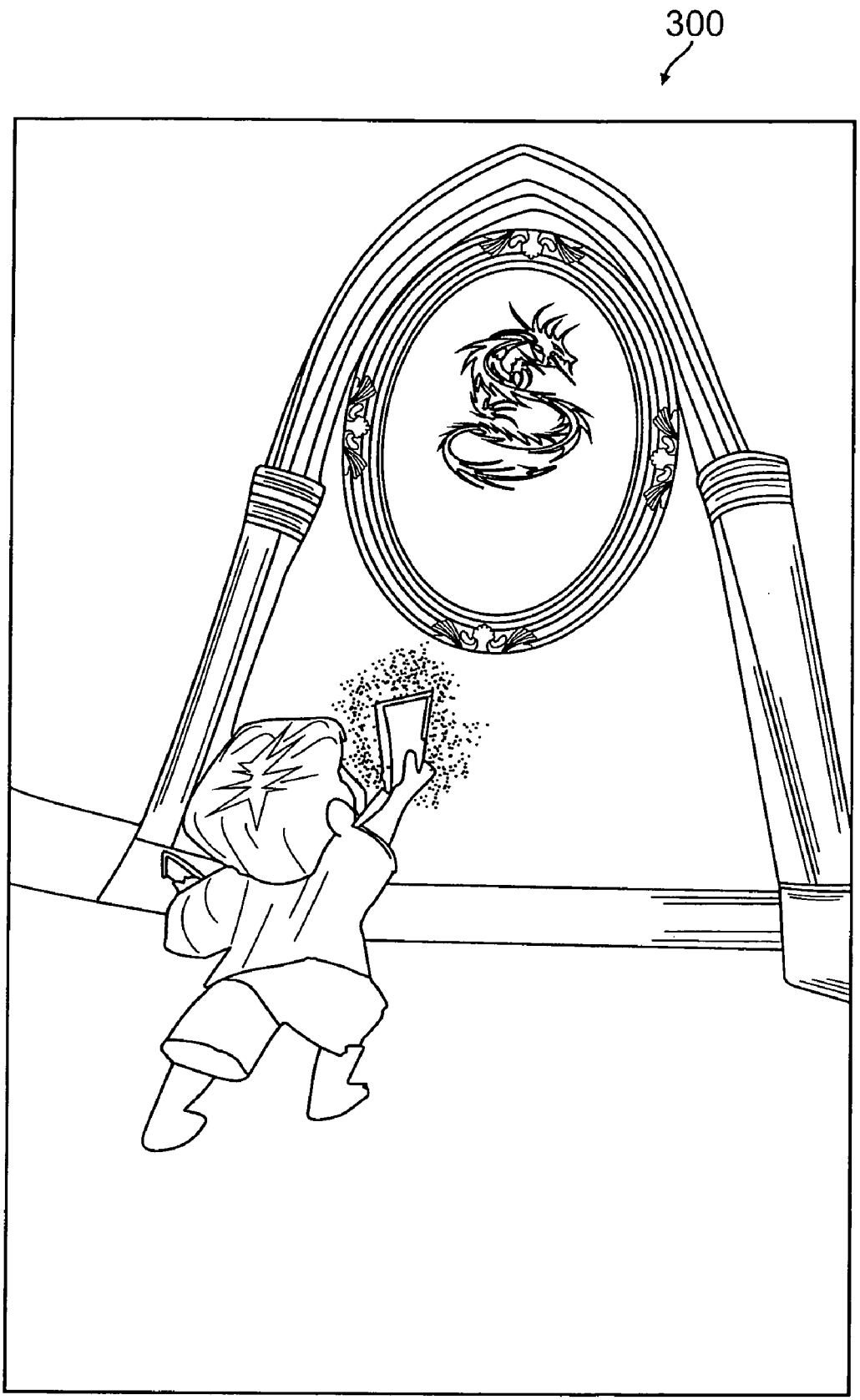
FIG. 3 presents an artist rendition of a user interacting with a personalized location-based game system including optical pattern recognition, according to one embodiment of the present invention.

FIG. 3 presents an artist's rendition of a user interacting with a personalized location-based game system including optical pattern recognition, according to one embodiment of the present invention. Drawing 300 depicts a rear projection surface configured to look like a mirror with a dragon shown on the surface. The components implementing the presentation layer might be hidden behind the wall or otherwise hidden by environmental props. The user is shown brandishing an attack card, which is read by an adjustable camera of an optical interface that identifies the attack card and informs the logic layer that the user selected that particular attack card. After the logic layer verifies that the attack card duly exists in the user account, the presentation layer shows the effect of the attack card, with the dragon roaring and being surrounded by the selected magic attack. After the magic spell effect finishes, the dragon might counterattack with fire breath, which could trigger a smoke machine and red flashing lights from a show control system. This back and forth exchange might continue until all cards are exhausted or the player or enemy is declared the victor, as determined by the logic layer.

Figure 4:
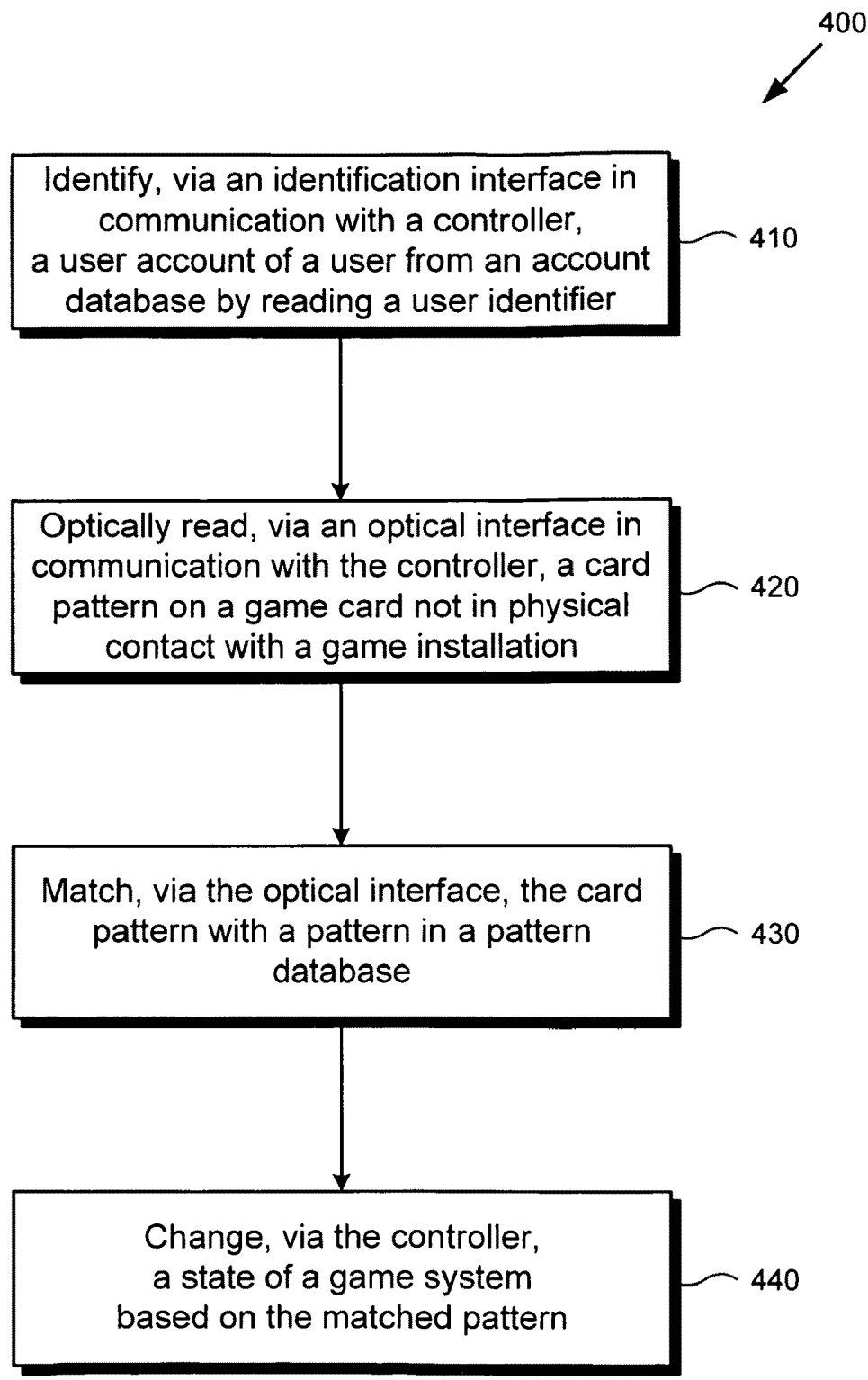
FIG. 4 shows a flowchart describing the steps, according to one embodiment of the present invention, by which an installation can provide a user with a personalized game system including optical pattern recognition.

FIG. 4 shows a flowchart describing the steps, according to one embodiment of the present invention, by which an installation can provide a user with a personalized game system including optical pattern recognition. Certain details and features have been left out of flowchart 400 that are apparent to a person of ordinary skill in the art. For example, a step may comprise one or more substeps or may involve specialized equipment or materials, as known in the art. While steps 410 through 440 indicated in flowchart 400 are sufficient to describe one embodiment of the present invention, other embodiments of the invention may utilize steps different from those shown in flowchart 400.

Referring to step 410 of flowchart 400 in FIG. 4 and installation 100 of FIG. 1, step 410 of flowchart 400 comprises RFID interrogator 111 and RFID antenna 112 in communication with installation controller 110 identifying a user account associated with user 140 from user account database 125 by reading RFID tag 141. RFID tag 141 may contain, for example, a unique account number that provides the association to user 140 in user account database 125. This unique account number may then be communicated to installation controller 110, which in turn communicates with game logic server 120 to access the relevant user account within user account database 125. As previously discussed, the identification interface used in step 410 is not necessarily restricted to RFID, although RFID may be particularly suitable due to the low cost of RFID tags. After step 410 is completed, the user account associated with user 140 may be utilized by the game system to provide game personalization.

Referring to step 420 of flowchart 400 in FIG. 4 and installation 100 of FIG. 1, step 420 of flowchart 400 comprises pattern recognition system 130 optically reading, via camera 131, a card pattern on card 145, where card 145 is not in physical contact with any other part of installation 100. Camera 131 thus focuses on card 145, capturing a card pattern of card 145 and possibly applying various image processing steps to facilitate fast and accurate pattern matching, such as noise filters and automatic image adjustments. As previously discussed, camera 131 may be highly programmable and adjustable to allow a user more physical freedom in presenting a detectable card pattern. Continuing with the dragon battle example discussed above, step 420 would optically read a card pattern corresponding to the "Ice Blast" magic spell, which might for example comprise a stylized drawing of an icicle. If additional detectable card patterns exist on card 145, step 420 might be repeated multiple times.

Besides focusing directly on card 145, camera 131 might also optically read a larger scene that includes card 145 and possibly other objects, such as user 140 or a surrounding background environment. By applying image identification techniques, pattern recognition system 130 can discern and isolate card 145 from the other objects within the larger scene, including user 140 and the surrounding background environment. In this manner, the camera does not need to precisely zoom to card 145 alone, but can safely include other scene elements and rely on pattern recognition system 130 to isolate the objects of interest, or card 145 in the present case.

Referring to step 430 of flowchart 400 in FIG. 4 and installation 100 of FIG. 1, step 430 of flowchart 400 comprises pattern recognition system 130 matching, by communication with installation controller 110, the card pattern read from step 420 with a pattern from pattern database 126. Continuing with the dragon battle example, step 430 would recognize the "Ice Blast" pattern by communicating with installation controller 110 to access pattern database 126. Since step 420 provided a card pattern with the stylized icicle drawing corresponding to "Ice Blast" in pattern database 126, installation controller 110 can inform game logic server 120 that the user selected the "Ice Blast" card for play.

Referring to step 440 of flowchart 400 in FIG. 4 and installation 100 of FIG. 1, step 440 of flowchart 400 comprises changing, via installation controller 110, a state of the game system depending on the recognized pattern from step 430. In other words, the logic layer, or installation controller 110 and game logic server 120, decides how to advance the game based on the selected card. Various gameplay possibilities enabled by step 440 have already been discussed in some detail above.

As part of the advantages of various embodiments of the present invention, users are presented with a compelling game experience that can be enjoyed in a dramatic fashion in specially configured installations or leisurely at home in a traditional online gaming environment. Card-based games are enjoying a recent popularity renewal, and game interfaces integrating physical experiences with freeform movement are quickly outpacing traditional models using gamepads and other input devices that foster sedentary behaviors. The personalized location-based game system, including the optical pattern recognition of this application, leverages these new trends in interactive gaming, providing a timely and exciting experience for players and a profitable business plan for vendors. By utilizing common printed cards with a firmly established manufacturing and distribution chain and with no embedded data at risk of modification, cost and security concerns are addressed and customization options for players are rendered wide open, further enhancing the community appeal of the game system and promoting continued popularity into the future.

From the above description of the invention it is manifest that various techniques can be used for implementing the concepts of the present invention without departing from its scope. Moreover, while the invention has been described with specific reference to certain embodiments, a person of ordinary skill in the art would recognize that changes can be made in form and detail without departing from the spirit and the scope of the invention. As such, the described embodiments are to be considered in all respects as illustrative and not restrictive. It should also be understood that the invention is not limited to the particular embodiments described herein, but is capable of many rearrangements, modifications, and substitutions without departing from the scope of the invention.

What is claimed is:

1. A personalized game system comprising:
    a user account database containing user accounts for a plurality of users;
    a pattern database containing recognition data for a plurality of patterns;
    a controller in communication with the user account database and the pattern database; and
    a game installation comprising:
        an audiovisual presentation system;
        an identification interface in communication with the controller, the identification interface configured to read a user identifier to identify a user account of a user from the user account database; and
        an optical interface in communication with the controller, the optical interface configured to:
            optically read a card pattern on a game card not in physical contact with the game installation for playing a game, the card pattern being in a shape of an image used in the game; and
            match the card pattern with a pattern in the pattern database;
        wherein the controller is configured to change a state of the game system based on the matched pattern.

2. The game system of claim 1, wherein the controller is configured to determine whether the game card is registered in the user account.

3. The game system of claim 2, wherein the change to the state of the game system further depends on the unique location of the game installation.

4. The game system of claim 2, wherein a client system connected to the network causes a change to the state of the game system.

5. The game system of claim 1, wherein prior to optically reading the card pattern, the optical interface is further configured to:
    optically read a scene containing the game card; and
    locate the game card within the scene.

6. The game system of claim 1, wherein the state of the game system includes the user account of the user.

7. The game system of claim 1, wherein the change to the state of the game system further triggers the audiovisual presentation system to playback audio and video for the user.

8. The game system of claim 7, wherein the audiovisual presentation system includes a show control system that manipulates a local environment.

9. The game system of claim 1, wherein the optical interface includes an adjustable digital camera connected to pattern recognition hardware.

10. The game system of claim 1, wherein the identification interface comprises an RFID interrogator, and wherein the user identifier is read from an RFID tag carried by the user.

11. The game system of claim 1, wherein the identification interface comprises an infrared receiver, and wherein the user identifier is read from an infrared transmitter carried by the user.

12. The game system of claim 1, wherein the identification interface comprises an optical reader, and wherein the user identifier is read from a printed bar code carried by the user.

13. The game system of claim 1, wherein the identification interface comprises a biometric scanner, and wherein the user identifier is read from a biometric trait of the user.

14. The game system of claim 1, wherein a plurality of games is supported, and wherein the user account of the user determines a game to be played from the plurality of games.

15. A method for use by a game installation of a personalized game system, the game system having a controller in communication with a user account database including user accounts for a plurality of users and a pattern database including recognition data for a plurality of patterns, the method comprising:

identifying, via an identification interface in communication with the controller, a user account of a user from the user account database by reading a user identifier;

optically reading, via an optical interface in communication with the controller, a card pattern on a game card not in physical contact with the game installation for playing a game, the card pattern being in a shape of an image used in the game;

matching, via the optical interface, the card pattern with a pattern in the pattern database; and changing, via the controller, a state of the game system based on the matched pattern.

16. The method of claim 15 further comprising determining whether the game card is registered in the user account.

17. The method of claim 16, wherein the change to the state of the game system further depends on the unique location of the game installation.

18. The method of claim 15, wherein prior to optically reading the card pattern, the optical interface is further configured to perform:

optically reading a scene containing the game card; and locating the game card within the scene.

19. The method of claim 15, wherein the identification interface comprises an RFID interrogator, and wherein the user identifier is read from an RFID tag carried by the user.

20. A personalized location-based game system including a user account database having user accounts for a plurality of users, a pattern database having recognition data for a plurality of patterns, a controller in communication with the user account database and the pattern database, and a plurality of game installations each having a unique location and connected to a network, each game installation comprising:

an audiovisual presentation system;

an identification interface in communication with the controller, the identification interface configured to read a user identifier to identify a user account of a user from the user account database;

an optical interface in communication with the controller, the optical interface configured to:

optically read a scene containing a game card not in physical contact with the game installation;

locate the game card within the scene;

optically read a card pattern on the game card for playing a game, the card pattern being in a shape of an image used in the game; and match the card pattern with a pattern in the pattern database;

wherein the controller is configured to change a state of the game system based on the matched pattern and the unique location of the game installation.

* * * * *